United States Patent
Batchu et al.

(10) Patent No.: US 10,025,836 B2
(45) Date of Patent: Jul. 17, 2018

(54) APPLICATION SYNCHRONIZATION

(71) Applicant: MOBILE IRON, INC., Mountain View, CA (US)

(72) Inventors: Suresh Kumar Batchu, Milpitas, CA (US); Mansu Kim, Cupertino, CA (US)

(73) Assignee: MOBILE IRON, INC., Mountain View, CA (US)

( * ) Notice: Subject to any disclaimer, the term of this patent is extended or adjusted under 35 U.S.C. 154(b) by 284 days.

(21) Appl. No.: 14/569,547

(22) Filed: Dec. 12, 2014

(65) Prior Publication Data

US 2015/0169615 A1 Jun. 18, 2015

Related U.S. Application Data

(60) Provisional application No. 61/926,902, filed on Jan. 13, 2014, provisional application No. 61/915,460, filed on Dec. 12, 2013.

(51) Int. Cl.
*G06F 17/30* (2006.01)
*H04W 4/50* (2018.01)
*H04W 4/60* (2018.01)

(52) U.S. Cl.
CPC ........ *G06F 17/30557* (2013.01); *H04W 4/50* (2018.02); *H04W 4/60* (2018.02)

(58) Field of Classification Search
CPC ........ G06F 17/30557; G06F 17/30575; G06F 11/1464
USPC ....... 707/610–614, 617, 618, 621, 624, 625, 707/640–648
See application file for complete search history.

(56) References Cited

U.S. PATENT DOCUMENTS

| | | | |
|---|---|---|---|
| 7,317,907 B2 | 1/2008 | Linkert et al. | |
| 7,983,249 B2 | 7/2011 | Galluzzo et al. | |
| 7,987,471 B2 | 7/2011 | Herzog et al. | |
| 8,121,585 B2 | 2/2012 | Commarford et al. | |
| 2003/0130984 A1* | 7/2003 | Quinlan | G06F 9/52 |
| 2005/0240631 A1* | 10/2005 | Willard | H04L 41/0816 |
| 2006/0229054 A1* | 10/2006 | Erola | H04M 1/24 |
| | | | 455/403 |
| 2006/0277442 A1* | 12/2006 | Lantz | G06F 11/0742 |
| | | | 714/38.1 |
| 2008/0239965 A1* | 10/2008 | Tang | H04L 43/065 |
| | | | 370/241 |
| 2009/0037492 A1* | 2/2009 | Baitalmal | G06F 17/30575 |
| 2010/0250939 A1* | 9/2010 | Adams | G06F 11/1458 |
| | | | 713/171 |

(Continued)

OTHER PUBLICATIONS

Abidar et al., "Mobile Device and Multi Agent Systems: An Implemented Platform of Real Time Data Communication and Synchronization" Multimedia Computing and Systems (ICMCS), 2011 International Conference on, IEEE. Apr. 7, 2011 (Apr. 7, 2011), pp. 1-6.

*Primary Examiner* — Hares Jami
(74) *Attorney, Agent, or Firm* — Van Pelt, Yi & James LLP

(57) ABSTRACT

Application synchronization techniques are disclosed. An indication is received that a mobile app has performed an operation affecting mobile app data of the mobile app. At least a portion of the mobile app data is stored to a remote storage system based at least in part on the indication. The indication may be received by and the storing operation may be performed at least in part by a management code embedded in mobile app code comprising the mobile app.

22 Claims, 11 Drawing Sheets

(56) References Cited

U.S. PATENT DOCUMENTS

| | | |
|---|---|---|
| 2012/0015644 A1 | 1/2012 | Danford |
| 2013/0111208 A1 | 5/2013 | Sabin et al. |
| 2013/0212067 A1 | 8/2013 | Piasecki et al. |
| 2013/0318207 A1 | 11/2013 | Dotter |
| 2014/0279870 A1* | 9/2014 | Saputra ............ G06F 17/30575 707/610 |

* cited by examiner

APPLICATION SYNCHRONIZATION

CROSS REFERENCE TO OTHER APPLICATIONS

This application claims priority to U.S. Provisional Patent Application No. 61/915,460, entitled APPLICATION SYNCHRONIZATION filed Dec. 12, 2013, and U.S. Provisional Patent Application No. 61/926,902, filed Jan. 13, 2014, both of which are incorporated herein by reference for all purposes.

BACKGROUND OF THE INVENTION

Many enterprises manage employee mobile devices using a mobile device management (MDM) system. Mobile devices managed using an MDM system may include managed applications, for example, provided by the enterprise. Managed applications may provide an enterprise user with tools integral to the performance of the employee's job. And important enterprise data (e.g., confidential data) is often generated using managed applications and stored on the device. In certain cases, an employee may be interrupted from performing their job when issues arise with a managed application on an employee's device. Employee productivity may also be interrupted when a user transitions to a new device and needs reconfigure managed applications on the new device. It would therefore be useful if a system could be developed to synchronize application data with a remote storage system.

BRIEF DESCRIPTION OF THE DRAWINGS

Various embodiments of the invention are disclosed in the following detailed description and the accompanying drawings.

DETAILED DESCRIPTION

Figure 1:
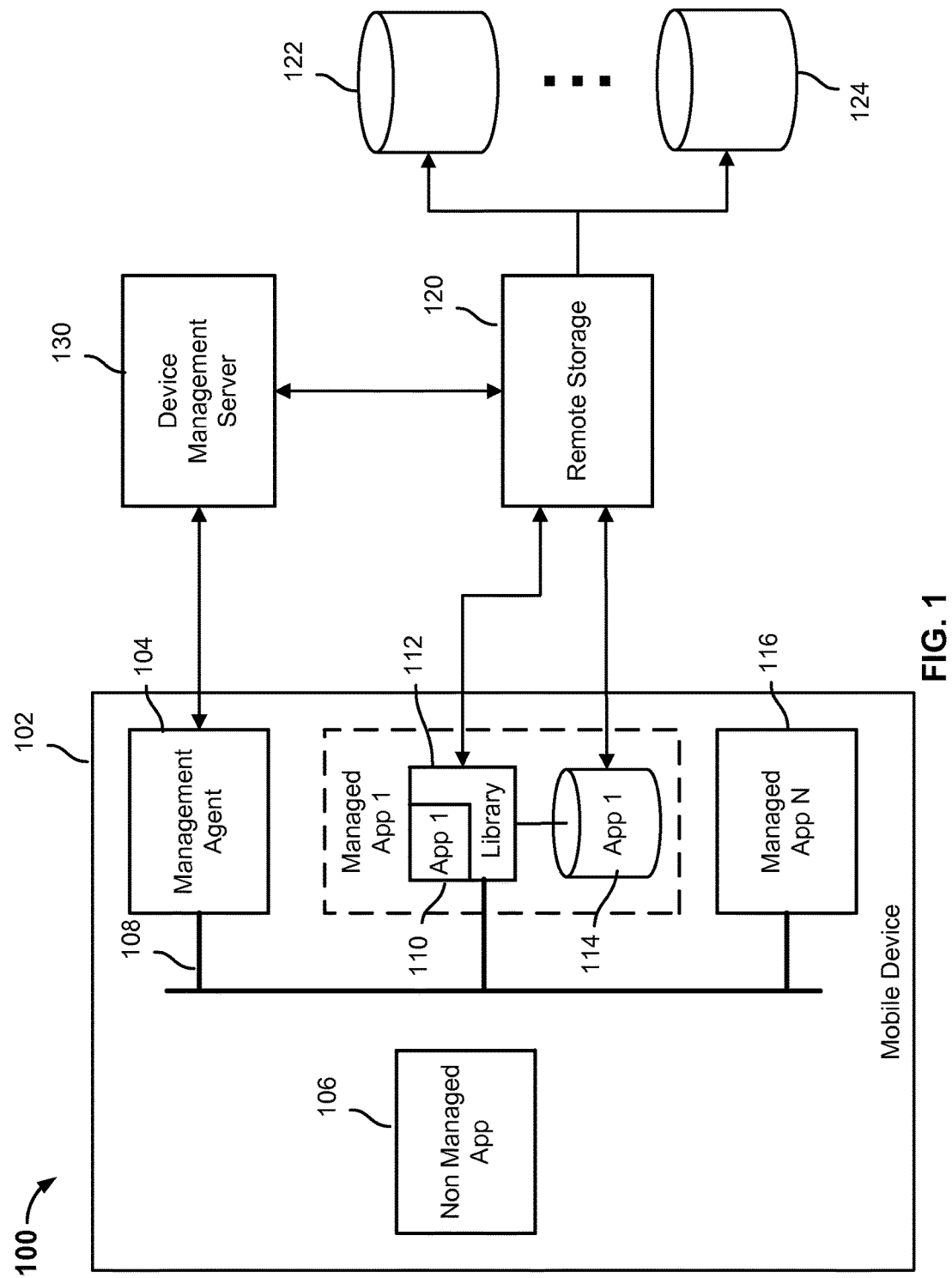
FIG. 1 is a block diagram illustrating embodiments of a system to synchronize application data.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Application synchronization techniques are disclosed. The techniques disclosed herein may be used to synchronize and/or store application data to a remote storage system external to a mobile device. In certain cases, application management code may synchronize and/or store application data to the remote storage system at least in part in response to an indication that the application has performed an operation affecting application data of the application.

In various embodiments, application data synchronized to a remote storage system may be used by a help desk technician to troubleshoot issues with an application on an employee's device. Application data synchronized to the remote storage system may, for example, be provided to a mobile device associated with a help desk technician. The synchronized data may be provided to an instance of the application on the help desk technician's mobile device, and the issue with the employee's application may be recreated on the help desk mobile device. The help desk technician may resolve the issue on the help desk mobile device and updated application data including a solution to the problem may be synchronized to the employee's mobile device and/or other users' devices.

In some embodiments, the techniques disclosed herein may be utilized to backup application data from multiple applications on a user's mobile device by, for example, synchronizing application data to a remote storage system. The synchronized data (e.g., backup data) may be used to restore applications on the mobile device and/or a different mobile device to a state at the time of the backup operation.

In various embodiments, an indication is received that a mobile app has performed an operation affecting mobile app data of the mobile app. At least a portion of the mobile app data is stored to a remote storage system based at least in part on the indication. The indication may be received and the storing operation may be performed at least in part by a management code embedded in mobile app code comprising the mobile app.

FIG. 1 is a block diagram illustrating embodiments of a system to synchronize application data. In the example shown, a system 100 to synchronize application data includes a mobile device 102, a remote data storage system 120, a device management server 130, and/or other components. A mobile device 102 may include a smartphone, tablet, and/or any other mobile computing device. A mobile device 102 may include a management agent 104; a set of one or more managed application(s) 110, 116; non-managed applications 106; and/or other components. A management agent 104 may include a mobile app and/or other client that provides mobile device management (MDM) capabilities on the mobile device 102, as configured by and/or under the control and direction of a remote mobile device management server 130. The management agent 104 is associated with and participates in the management of a set of managed mobile app(s) 110, 116 associated within a secure zone of mobile device 102.

In various embodiments, the management agent 104 and managed mobile apps such as apps 110 and 116 communicate securely via a secure communication bus 108. In various embodiments, the secure communications bus 108 comprises a secure app connect bus, as described, for example, in U.S. patent application Ser. No. 14/137,745, entitled SECURE MOBILE APP CONNECTION BUS, filed Dec. 20, 2013 and published as US-2014-0181518-A1 on Jun. 26, 2014, the disclosure of which is incorporated herein by reference in its entirety for all purposes.

In some embodiments, one or more managed app(s) 110, 116 store data in local application data storage on the mobile device. The application data storage 114 associated with a managed app 110 may include application folders and/or other persist data, such as documents, images, structured query language (SQL) files, keychain data (e.g., passwords, certificates, user credentials), application configuration data, application settings, and/or any other data associated with the application 110. In some cases, application data storage 114 may include a cache storage for synchronized application data as discussed in detail below. In certain cases, application data may be encrypted by, for example, a library associated with the application prior to storage in the application data storage 114 and/or synchronization to the remote data storage system 120 as discussed below.

In various embodiments, a managed app 110 includes management code, such as an application synchronization and/or storage library 112 and/or other MDM libraries. The management code (e.g., a synchronization and/or storage library 112) may be embedded in the app code 110 of the mobile app. A library 112 may be embedded in a managed application 110 using various approaches. Techniques for embedding the library 112 may include, for example, embedding the library using a software development kit (SDK) that a developer adds to the application source code, wrapping a library into a compiled application binary, injecting the library to an application dependent system library, and/or other approaches. In one example, assembly code of application 110 is modified to include the library 112. Assembly code of the application 110 may be modified so that certain application commands are replaced with commands included in the synchronization library 112. For example, file access commands (such as file open, file write, file close, and/or file read commands) are replaced by file access commands (e.g., file access application programming interface (API) commands) included in the synchronization library 112. By embedding the library 112 in the application 110, the library 112 may access the functionality (e.g., all functionality) of the application.

In various embodiments, a synchronization library 112 may be configured to synchronize and/or otherwise transfer data from a managed application 110 to a remote storage system 120. In some cases, a synchronization library 112 and/or management code associated therewith monitors various operations performed by a managed application 110. In certain cases, an indication is received that that a managed application 110 has performed an operation affecting mobile app data of the mobile app. In some cases, an indication is received that that a managed application 110 has performed an operation affecting mobile app data stored persistently by the mobile app on a mobile device. Mobile app data may include any data associated with an application including, for example, documents, images, structured query language (SQL) files, keychain data (e.g., passwords, certificates, user credentials), application configuration data, application settings, and/or any other application-related data. In certain cases, application data may be stored in application data storage 114 on the mobile device 102. An operation affecting mobile app data may include, for example, a file access operation associated with the application data storage 114. The file access operation may include, for example, a file open, file write, file read, file close, file save, and/or other file access operation. In certain cases, an indication the mobile app has performed the operation may be received by the synchronization library 112. In some cases, an operation affecting mobile app data may include a system call to access persistent data associated with the application 110, such as keychain data, a database, embedded browser cache data, and/or other persistently stored data. In certain cases, the synchronization library 112 intercepts and/or otherwise detects a file access operation and/or other operation affecting mobile app data stored on the device 102.

In some embodiments, the synchronization library 112 and/or management code associated therewith synchronizes at least a portion of the mobile app data to a remote storage system 120. In certain cases, the mobile app data is synchronized based on a received indication that an application 110 has performed an operation affecting app data stored persistently on the device 102. In one example, a file access operation, such as a file write operation, is detected by the library 112. In response to the detected file access operation, the library 112 synchronizes application data to a remote storage system 120. In certain cases, the library 112 synchronizes mobile app data affected by the file access operation. For example, the library 112 may synchronize mobile app data changed as a result of a file access operation performed by the mobile app. In another example, the library 112 may evaluate any changes to mobile app data over a period of time, such as a period between two file access operations. The library 112 may synchronize mobile app data that has changed between the two file access events (e.g., the delta). For example, newly generated and/or modified mobile app data may be synchronized to the remote storage system 120.

In some embodiments, a library 112 synchronizes data to the remote storage system 120 by retrieving mobile app data from a local mobile device storage 114 and sending the retrieved mobile app data to the remote storage system 120. For example, a library 112 may receive an indication of file open operation, and the library 112 may monitor subsequent application operations. The library 112 may, for example, be aware that modification to app data may be occurring, but the library 112 may not synchronize app data until a subsequent indication of a mobile application operation is received. The library 112 may subsequently receive an indication that the application has performed a file write operation. At this point, the library 112 may retrieve any application data modified by the write operation from the application storage 114, and may synchronize the data the remote storage system 120. In another case, the library 112 may wait until the application 110 has completed modifications to file. For example, the library 112 may not commence synchronization operation until an indication of a file close operation is received. Upon receipt of the indication of the file close operation, the library 112 may access a data storage 114 associated with the application and may synchronize application data included in the data storage 114 to the remote data storage system 120. In this case, the modified application data may be stored in an application synchronization cache storage (e.g., included in application storage 114) prior to synchronization with the remote storage system 120.

According to various embodiments, a library 112 may store application data directly to the remote storage system 120. In some cases, one or more managed applications 110 are configured by a storage library 112 to store application data (e.g., all application data) in an external storage. In certain cases, a managed application 110 may include no local mobile device storage 114, and all application data is directly synchronized with the remote storage system 120. In certain cases, local mobile device storage 114 may function only to provide a cached local copy of all and/or a portion of data stored at the external storage. In some cases, a mobile device 102 does not include a local mobile device storage 114. For example, it may be determined that a network (e.g., cellular network) to which the mobile device 102 is connected and/or frequently connects to has sufficient bandwidth and/or connection speed such that directly storing files to the remote storage system 120 would not slow down app performance and/or otherwise affect app user experience. In this case, when a library 112 receives an indication that an application has performed an operation affecting mobile application data, application data is directly synchronized to the remote data storage 120. For example, a library 112 may receive an indication of a file access operation, such as a file write operation, and in response to the indication may directly send application data to the remote storage system 120. In this case, the application data may, for example, not be stored in storage 114 local to the mobile device 102 prior to transmission to the remote storage system 120.

In some embodiments, a managed application 110 may not store application data in an application file directory. In this case, management code 112 including a JavaScript code and/or other code may be injected into the managed application code to retrieve application data. For example, certain embedded web browser applications (such as Webview) do not cache data in an application directory. In some cases, an indication that the embedded browser has performed an operation including a system call by the embedded browser to access an embedded browser cache is received. To retrieve application data from an embedded web browser, Javascript code is injected into the embedded browser code to control the behavior of the embedded browser. The behavior of the embedded web browser may be modified to access the embedded browser cache to retrieve web page data, web history, passwords, form auto-fill data, and/or other data. At least a portion of the data retrieved from the embedded browser cache may be stored and/or synchronized to the remote storage location 120.

According to some embodiments, the techniques disclosed herein may be used to synchronize keychain data. In certain cases, keychain data (such as user passwords, certificates, and/or other data) is stored in a keychain repository associated with the operating system of the mobile device. The library 112 may not have access to the keychain repository that is associated with the mobile device operating system. In this case, the library 112 may not have access to keychain data as it is passed from an application 110 to a keychain repository. The library 112 may, however, receive an indication that the application 110 has executed a system call to access persistent keychain data (such as user passwords, certificates, and/or other data) from a keychain repository. Upon access of the keychain data, the library 112 may retrieve/intercept the keychain data, and the keychain data may be stored and/or synchronized to the remote storage system 120.

In various embodiments, mobile app data is synchronized to the remote data storage system based on a trigger event. In one example, a trigger event may include, for example, a state and/or change in a state of the application 110, mobile device 102, and/or network. In one example, application data may be synchronized to a remote storage system 120 when application transitions from an inactive state (e.g., background state, killed state, etc.) to an active state (e.g., foreground, active state, etc.). In another example, application data may be synchronized to a remote data storage system 120 when a device transitions from powered on to a powered down state. In a further example, application data may be synchronized to a remote data storage system 120 when a device 102 connects to and/or disconnects from a network, such as a Wi-Fi network, virtual private network (VPN), cellular network, and/or any other network. In a further example, the management agent 104 may command an application 110 synchronize data with the remote storage system 120 as part of, for example, an application backup operation.

In some embodiments, synchronized mobile app data is received at the remote storage system 120. In certain cases, the remote storage system 120 is located in an enterprise storage repository (e.g., enterprise backend storage), and/or another location. The remote storage system 120 may store the synchronized data in a manner that associates the data with the mobile device 102, the application 110, and/or a user with which the mobile device 102 is associated. In certain cases, each application, user, and/or device deployed within an MDM system may be associated with a storage (e.g., folder, database, repository) in the remote storage system 120. In one example, a first storage 122 may be associated with a first mobile device, such as mobile device 102. The first storage 122 may include, for example, a file and/or directory structure that is related to the file and/or directory structure of the first mobile device. Within the first storage 122, there may be sub-storages for each of one or more applications on the first device. The remote storage system 120 may include multiple storages up to an Nth storage 124 that is associated with a Nth device. In another example, a first storage 122 may be associated with a first application on a device, such as application 110 on the mobile device 102. And the remote storage system 120 may include multiple application-specific storages up to an Nth storage 124 that is associated with an Nth application on the device 102, such as Nth managed application 116. In a further example, each of multiple users of a device and/or each of multiple users of separate devices may be associated with a storage. For example, a first storage 122 may be associated with a first user. The remote storage system 120 may include multiple storages up to an Nth storage 124 that is associated with an Nth user.

In various embodiments, synchronization data received at the remote storage system is processed and stored in a storage associated with the mobile device 102, a user of the mobile device, and/or an application 110 on the device 102. In certain cases, the synchronization data may be processed using, for example, de-duplication, compression, encryption, and/or other processing prior to storage.

Figure 2A:
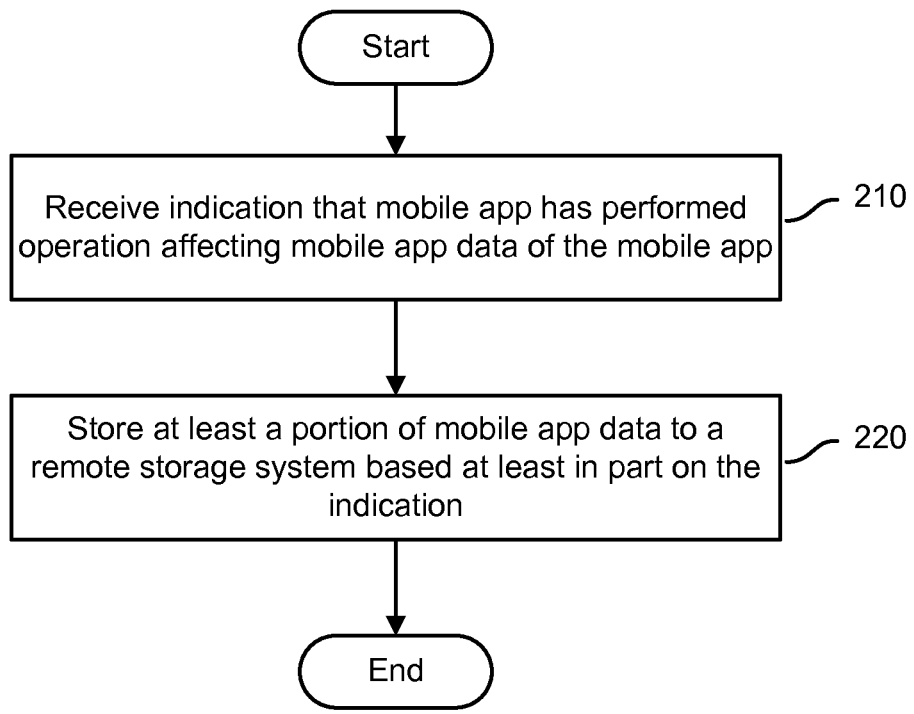
FIG. 2A is a flowchart illustrating embodiments of process to store mobile application data to a remote storage system.

FIG. 2A is a flowchart illustrating embodiments of process to store mobile application data to a remote storage system. In various embodiments, the process of FIG. 2A may be implemented using management code including a storage library, such as storage library 112 of FIG. 1. At 210, an indication is received that a mobile app has performed an operation affecting mobile app data of the mobile app. The indication may be received by management code, such as a storage library, embedded in mobile app code included in the mobile app. At 220, at least a portion of mobile app data is stored to a remote storage system based at least in part on the indication. The mobile app data may be stored to a remote storage system at least in part by management code, such as a storage library, embedded in the mobile app code.

Figure 2B:
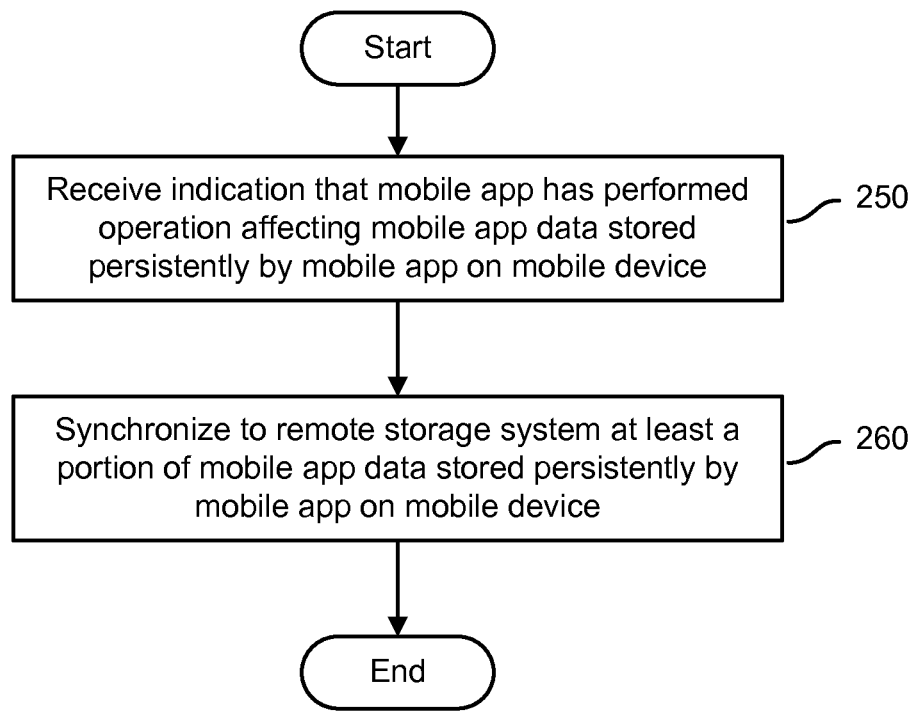
FIG. 2B is a flowchart illustrating embodiments of process to synchronize mobile application data to a remote storage system.

FIG. 2B is a flowchart illustrating embodiments of process to synchronize mobile application data to a remote storage system. In various embodiments, the process of FIG. 2B may be implemented using management code including a synchronization library, such as synchronization library 112 of FIG. 1. At 250, an indication is received that a mobile application has performed an operation affecting mobile app data stored persistently on a mobile device. The indication may be received by management code, such as a synchronization library, embedded in mobile app code included in the mobile app. At 260, at least a portion of the mobile app data stored persistently by the mobile application is synchronized to the remote storage system.

In some embodiments, management code receives an indication that a file access operation has occurred. A file access operation may include, for example, a file open, a file write, a file read, a file close, and/or other operation. Management code may intercept a request by the mobile application to perform the file access operation. In one example, management code intercepts a request to perform a file access operation, such as a file write operation, from application code to an application data storage including persistent application data. Based on the intercepted request, the management code may evaluate application data stored in persistent data storage on the device. Based on the evaluation, at least a portion of the mobile application data stored persistently on the mobile device is synchronized to a remote data storage system. In certain cases, all mobile app data stored persistently by the application is synchronized to the remote data storage system. In some cases, a portion of the mobile app data affected by the file access operation is identified, and the identified portion of the mobile app data is synchronized to the remote storage system. In one example, a file write operation is performed by an application to modify a document. The management code may receive an indication of the file write operation and may identify the portions of the document affected by the file write operation. Mobile app data including the document and/or the modified portions of the document may be synchronized to a remote data storage system. In some cases, all application data stored persistently by the application may be synchronized to the remote data storage upon the detection of the file write operation associated with the document.

Figure 3:
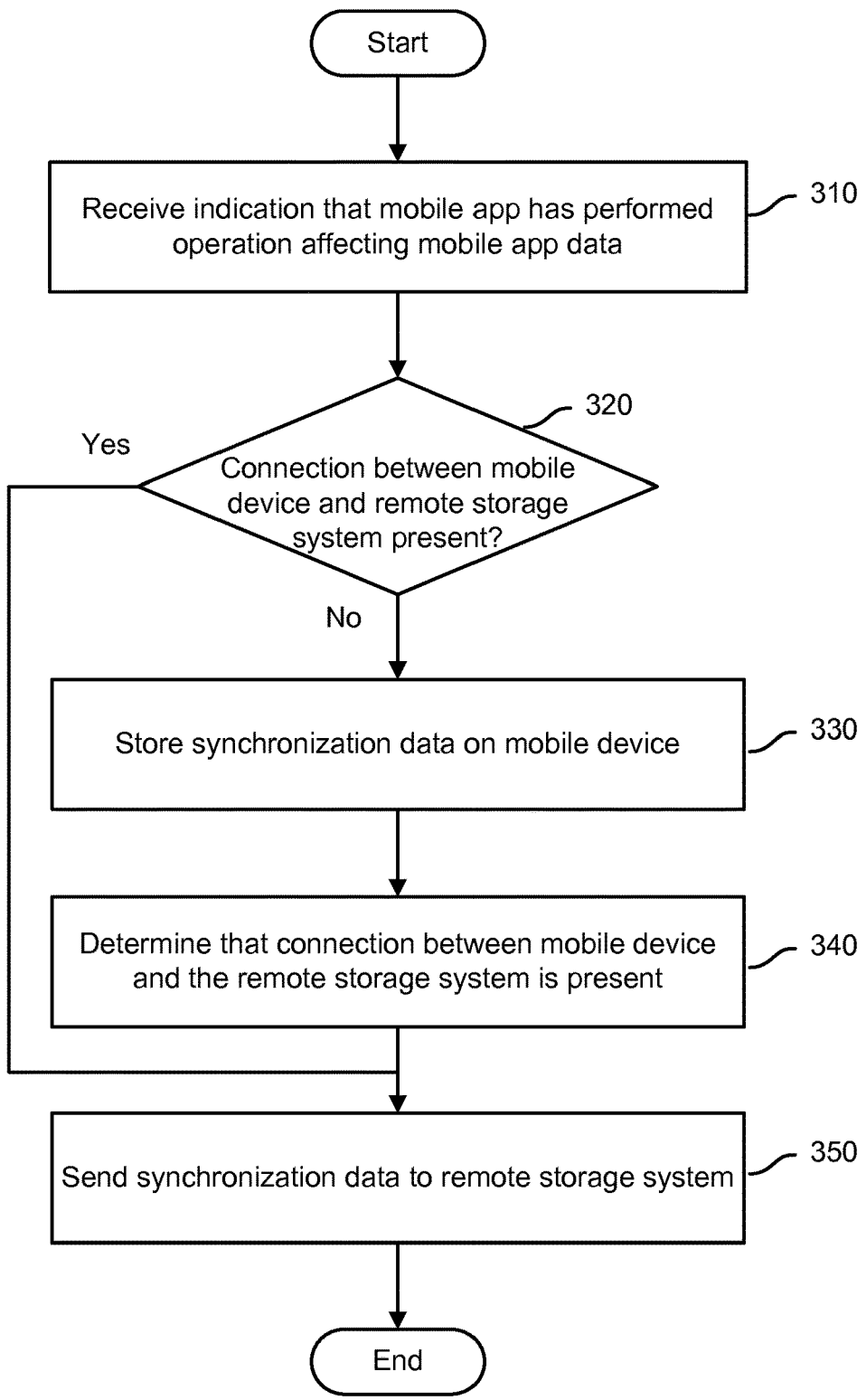
FIG. 3 is a flowchart illustrating embodiments of a process to synchronize application data with a remote storage system.

FIG. 3 is a flowchart illustrating embodiments of a process to synchronize application data with a remote storage system. In various embodiments, the process of FIG. 3 may be implemented using management code including a synchronization library, such as synchronization library 112 of FIG. 1. At 310, an indication is received that a mobile application has performed an operation affecting mobile application data. As discussed above, an operation affecting mobile application data may include a file access operation, such as a file open, file write, file read, file close, and/or other operation. Based on the received indication of the performance of the operation, it may be determined that mobile application data stored by the application is to be synchronized with a remote data storage system.

At 320, it is determined whether a connection between the mobile device and the remote storage system is present. In various embodiments, a connection between the mobile device and the remote storage system may be present when the device is connected to a cellular network, Wi-Fi network, virtual private network (VPN), and/or other network. In the event a connection exists between the mobile device and the remote storage system, the process proceeds to step 350. In the event the mobile device is offline and/or a connection otherwise does not exist, the process proceeds to step 330.

At 330, synchronization data is stored on the mobile device. In various embodiments, a management code embedded in a mobile application determines (e.g., based on an indication that a file access operation has been performed) that application data stored persistently by a mobile application is to be synchronized with a remote storage system. The management code may, for example, evaluate application data stored persistently on the mobile device to determine a set of application data to be synchronized. Synchronization data including a set of application data may be selected, and the synchronization data is prepared for synchronization and stored in a cache storage on the mobile device. In one example, all application data stored persistently on the device by an application may be selected for synchronization. In this case, synchronization data may include all application data stored persistently by the application and the synchronization data is stored in cache storage. In another example, it may be determined that only application data affected by an application operation (e.g., a file write operation) is to be synchronized. In this case, synchronization data includes the operation affected data, and the synchronization data is stored in cache storage on the mobile device. In various embodiments synchronization data stored on the mobile device (e.g., in cache storage) is encrypted. By encrypting data stored, for example, in cache storage, potential data leaks may be minimized.

At 340, it is determined that a connection between to mobile device and the remote storage system is present. In various embodiments, the management code and/or another component may monitor the mobile device network connection status. When the mobile device connects to a network (such as a cellular network, Wi-Fi network, VPN, etc.), it may be determined that a connection between the mobile device and the remote storage system is present.

At 350, synchronization data is sent to the remote storage system. Management code embedded in an application may, for example, provide synchronization data to the remote storage system. In some embodiments, the synchronization data is stored locally on the mobile device. In this case, the management code retrieves the synchronization data from the local storage (e.g., application cache storage) and provides the synchronization data to the remote storage system.

Figure 4:
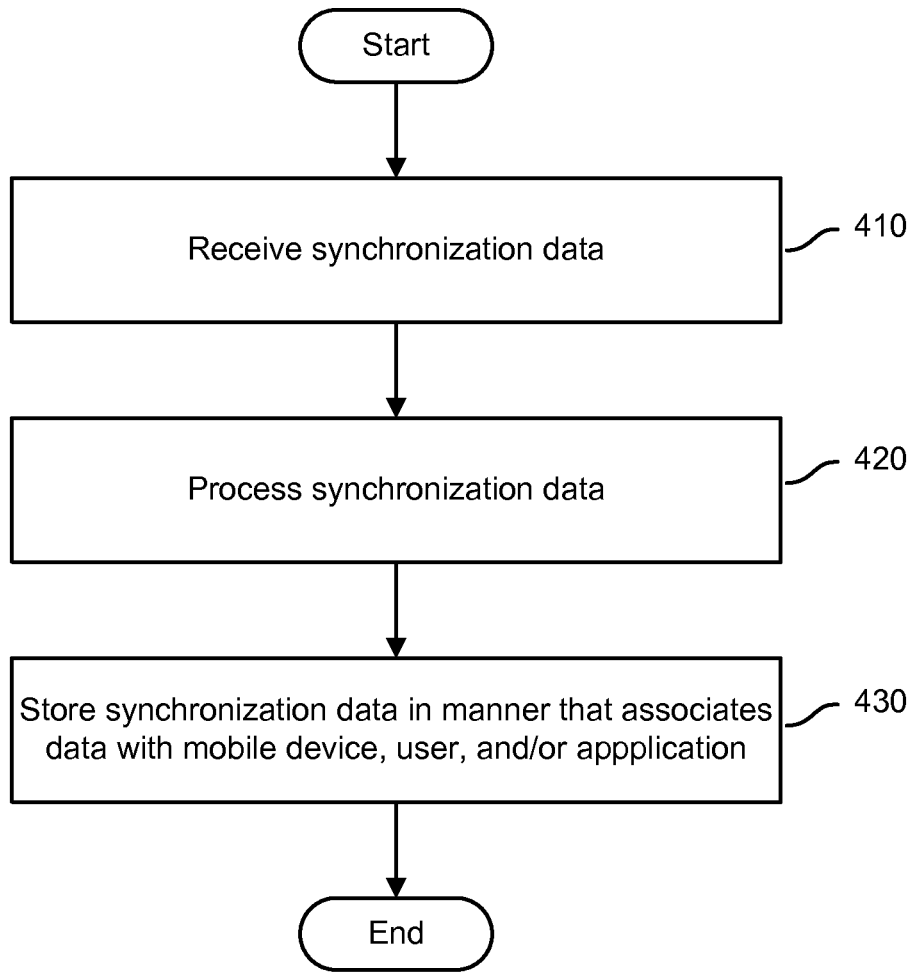
FIG. 4 is a flowchart illustrating embodiments of a process to store synchronization data at a remote storage system.

FIG. 4 is a flowchart illustrating embodiments of a process to store synchronization data at a remote storage system. In various embodiments, the process of FIG. 4 is performed at remote storage system, such as remote storage system 120 of FIG. 1. At 410, synchronization data is received. In various embodiments, synchronization data is received at a remote storage system from a mobile device. The synchronization data may be received from, for example, a managed application and/or management code associated with the managed application. As discussed above, synchronization data may include application data, such as application data affected by a file access operation.

At 420, the synchronization data is processed. In various embodiments, synchronization data is processed to identify an application and/or device from which the synchronization data was sent. The synchronization data may be processed to identify a user associated with the data (e.g., a user of the application and/or device that sent the synchronization data). In some embodiments, the synchronization data is compared to previously stored synchronization data, for example, from the same application. In this case, a portion of the synchronization data that is different relative to previously synchronized data is determined. In certain cases, only the synchronization data that has changed since a previous synchronization is stored. In other cases, a snapshot of the current state of an application is updated based on the received synchronization data so that the synchronized data for the application reflects the current state of the application (e.g., current settings, configuration, application data, etc.). In some embodiments, synchronization data is compressed and/or otherwise processed to minimize an amount of used data storage.

At 430, synchronization data is stored in a manner that associates the data with a mobile device, user, and/or application. In various embodiments, each application, user, and/or device deployed within an MDM system may be associated with a storage and/or portion thereof at the remote storage system. In certain cases, a device and/or user associated with a device is allotted a storage repository at the remote storage system. The storage repository may include directories and/or sub-storages for each of one or more applications on the device. In certain cases, a directory structure of a storage repository for a device may match and/or be similar to a directory structure of the local storage on the device.

In various embodiments, synchronization data received from an application on a device is stored in a storage repository associated with that device. The synchronization data may, for example, be stored in a directory associated with the application that is included in a storage repository for the mobile device and/or mobile device user.

Figure 5:
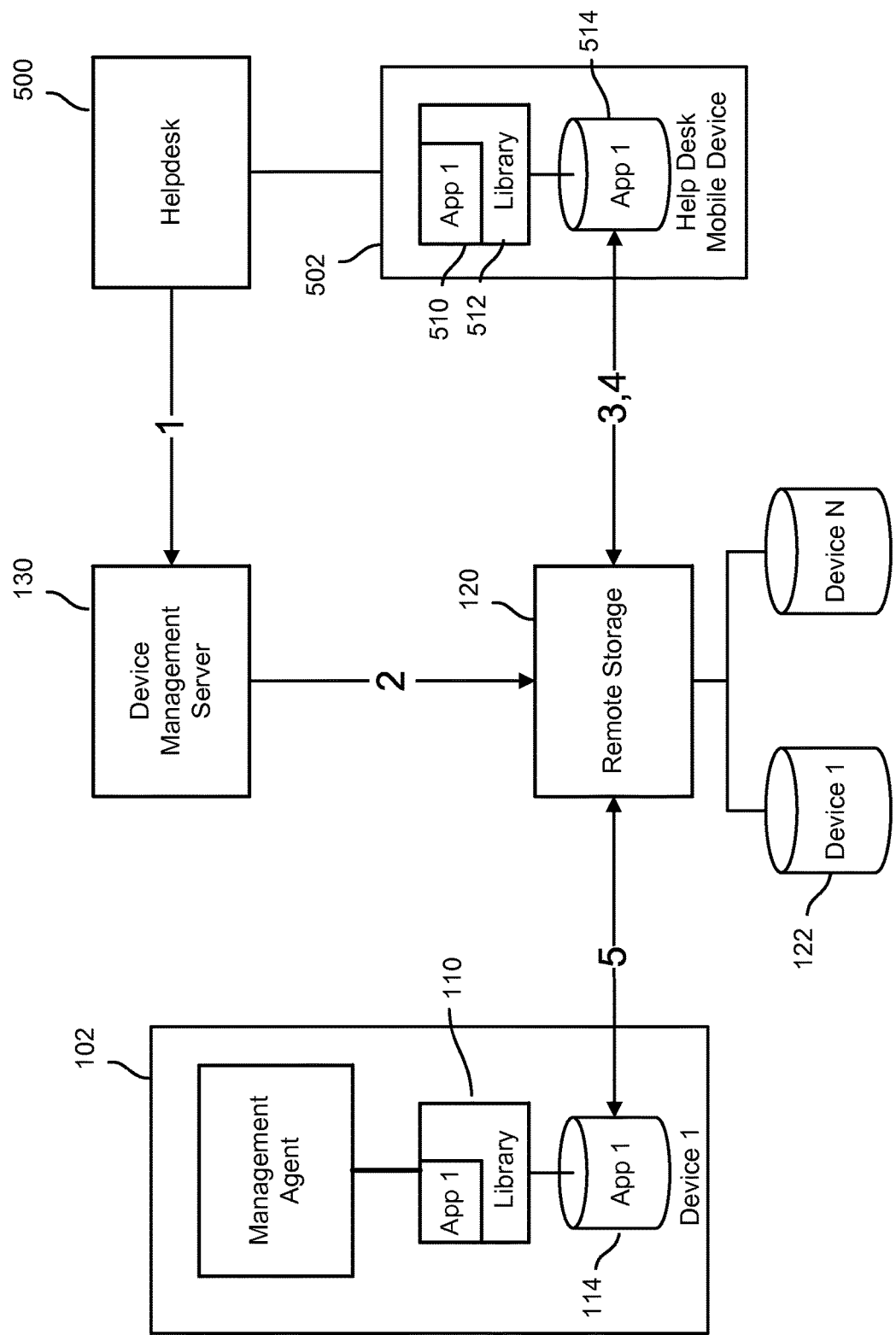
FIG. 5 is a block diagram illustrating embodiments of a system to use synchronized data in a help desk session.

FIG. 5 is a block diagram illustrating embodiments of a system to use synchronized data in a help desk session. In various embodiments, the techniques disclosed herein may be used to allow a help desk technician to diagnose and/or troubleshoot application-related issues on a user's mobile device. For example, an application 110 on user's mobile device 102 may not be functioning properly, and the user may request assistance from a help desk (e.g., enterprise help desk). To assist the user, the help desk technician may install, on a mobile device 502 associated with the help desk technician, an instance of the application 510 that is not functioning on the user's mobile device 102. In certain cases, the help desk technician using help desk console/system 500 sends a communication to device management server 130 (arrow "1") requesting synchronization data associated with the application 110, which is not functioning on the user's device 102. The communication may, for example, identify a mobile device 102 (e.g., the employee's mobile device—Device 1), a mobile device user, the application instance 110, and/or other information. The device management server 130 may receive the request.

In various embodiments, the device management server 130 sends a command to the remote storage system 120 to provide synchronized application data associated with the instance of the application 110 to the help desk technician's mobile device 502 (arrow "2"). Based on the command from the device management server 130, the remote storage system retrieves synchronized data from the application 110 on the user's mobile device 102. The synchronized data may, for example, be stored in a data storage 122 assigned to the user's mobile device (e.g., Device 1) at the remote storage system 120.

In some embodiments, the remote storage system 120 provides synchronized application data to the mobile device 502 associated with the help desk technician (arrow "3"). The synchronized application data may include synchronized application data associated with the application 110 on the employee's device 102. In certain cases, the synchronized application data may include application data that currently is associated with the application on the employee's device 102. For example, the synchronized data may include a snapshot of the application data currently applicable to the application instance 110 on the employee's device. The synchronized application data may include, for example, application data, keychain data (e.g., passwords, certificates, user credentials, etc.), application configuration data, application settings, and/or any other data associated with the application 110. In certain cases, the synchronized application data is provided to a local storage 514 associated with the application instance 510 on the help desk technician mobile device 502. In some embodiments, the synchronization application data sent to the application instance 510 may be mirrored to allow the instance of the application 510 on the help desk device 502 to interact with the synchronized application data without communicating with the employee's mobile device 102 and/or altering the data stored in remote storage system 120.

In various embodiments, the application 510 is launched on the help desk technician's mobile device 502. The synchronized application data from the remote data storage 120 is loaded in the application instance 510. And the issue with the instance of the application 110 on the employee's device may be recreated in the instance of the application 510 on the help desk technician's mobile device 502. The help desk technician may diagnose the issue with the application instance 510, change application settings, reconfigure the application instance 510 and/or perform other operations. Once the issue has been resolved by the technician, a library 512 associated with the application instance 510 on the help desk mobile device 520 synchronizes any changed application data including, for example, changed/updated application settings, application configuration information, and/or other information with the remote storage system 120 (arrow "4").

In various embodiments, the remote storage system 120 stores the changed/updated synchronization data from the help desk mobile device 502 in a storage associated with the employee's mobile device 122 and/or another storage at the remote storage system 120. The remote storage system 120 synchronizes the changed synchronization data from the instance of the application 510 on the help desk mobile device 502 with the application instance 110 on the employee's mobile device 102 (arrow "5"). In various embodiments, the remote storage system 120 synchronizes the changed synchronization data from the instance of the application 510 on the help desk mobile device 502 with instances of the application on multiple users' devices. The synchronization data from the help desk mobile device 502 may include updating settings, application configuration information, and/or other application data, which when applied to the application instance 110 on the employee's mobile device 102 resolves the issue with the application 110. Using these techniques, a help desk technician may identify an issue with an instance of an application 110 on an employee's device 102, determine a solution to the issue, and/or apply the solution to the instance of the application 110 on the employee's device without physically interacting with the employee's device and/or guiding the user through steps to fix the problem.

In various embodiments, a notification may be provided on the mobile device 102 to alert a user that application data (e.g., as modified by the help desk technician) is to be synchronized to the application 110. A prompt may be output to the user to approve the synchronization of the application instance 110 with the application data from the help desk application instance 510. In certain cases, the notification and/or prompt may be output only if the scale of changes, amount of synchronized data and/or stored data, and/or other factors indicate that the user should be prompted prior to applying the changes to the application instance 510. For example, if changes to the application 110 are minor, the user may not be notified. If, however, the scale of the changes is significant, the user may be prompted to approve the changes. In certain cases, a notification may be sent to the app 110 and/or mobile device 102 using a platform push notification service.

In some embodiments, an application instance 510 may provide a help desk technician with additional functionality. An application instance 510 on a help desk mobile device 502 may, for example, provide an ability to directly modify certain application data to build a template using the application data. For example, a template may be generated including application configurations, application settings, and/or other information. In certain cases, application settings in the template including, for example, user specific information (e.g., email address in an email application) may be replaced with generic parameters (e.g., $EMAIL$). An application instance 510 including the template may be modified at the help desk mobile device 502, and the remote storage 120 may, for example, apply the changes to the template to multiple instances of the application as stored on multiple users' devices. In one example, changes are made to an email application template in the application instance 510 on the help desk mobile device 502, and the changes to the email application template may be synchronized to multiple users' mobile devices.

Figure 6:
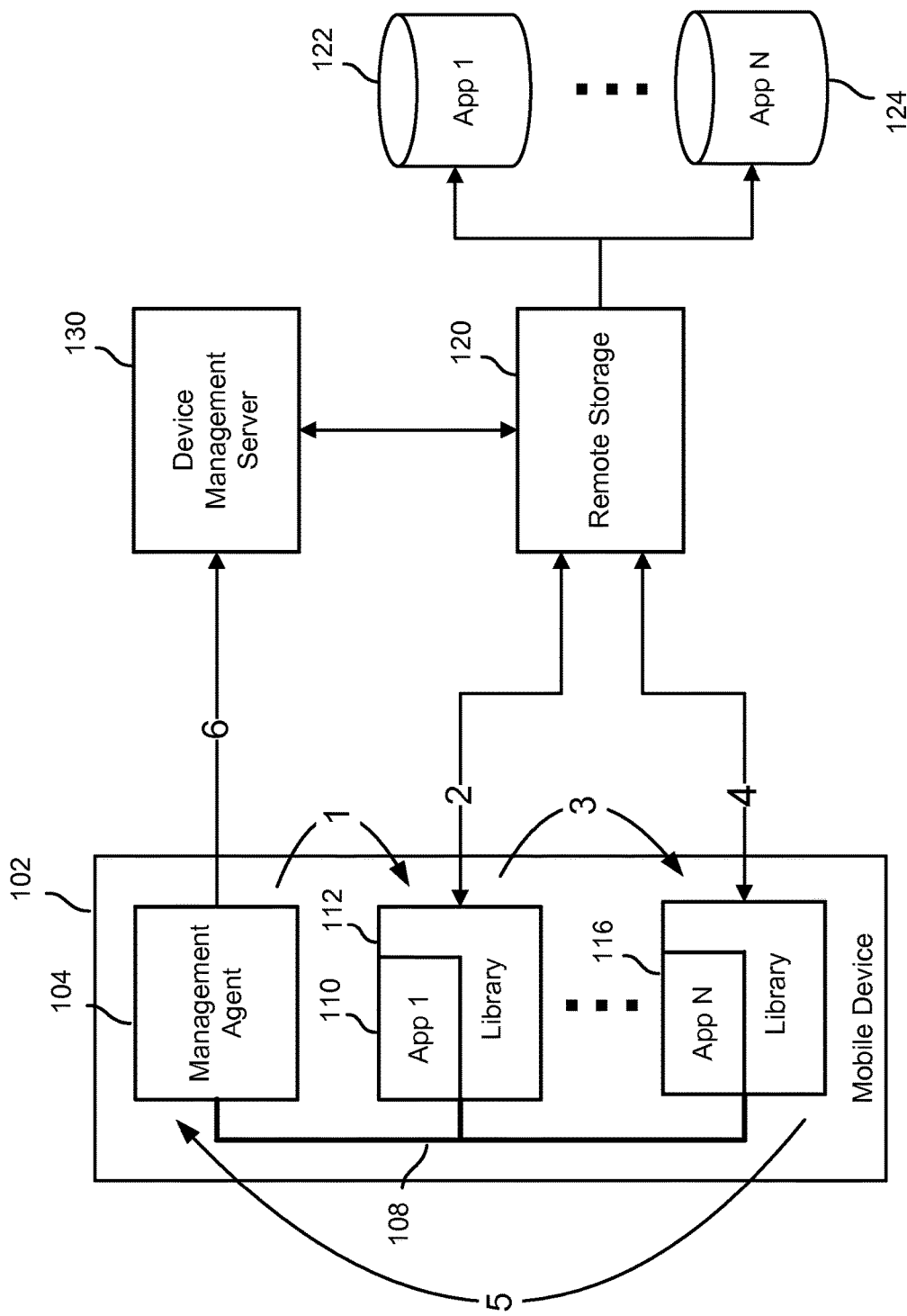
FIG. 6 is a block diagram illustrating embodiments of a system to backup application data.

FIG. 6 is a block diagram illustrating embodiments of a system to backup application data. In various embodiments, the techniques disclosed herein may be used to back up managed application data. In certain cases, a user may need to back up managed application data from a device and later restore the data to the same device and/or a different device. In one example, a mobile device operating system may be upgraded, and it may be necessary to re-install applications if the upgrade causes an error in one or more applications. Errors in installing applications may cause delays and/or reduce employee productivity. Using the techniques disclosed herein, when a user upgrades and/or changes to a new device, application data from the remote storage system may be synchronized to the new mobile device and one or more applications on the new device may be restored to a prior state.

In the example shown, a backup operation may be initiated at a management agent 104 on a mobile device 102. In one example, a user of the device 102 may invoke the management agent 102 to initiate an application data backup operation. In another example (not shown), a device management server 130 commands the management agent to initiate a backup operation. In certain cases, the management agent 104 generates backup instruction information (e.g., backup instructions). Backup instruction information may include commands to synchronize application data to a remote storage system, a list of one or more managed applications to which the commands are applicable, an order/sequence in which the applications are to synchronize, backup status information for each of the applications, and/or other information.

In various embodiments, the management agent 104 launches a first application and/or provides backup instruction information to a first managed application 110 (arrow "1"). In certain cases, a management agent 104 may launch/activate the first application using a uniform resource locator (URL) scheme associated with the first application 110. The backup instruction information is provided from the management agent 104 to the first managed application 110 using a secure application connection bus 108. The first managed application 110 and/or a synchronization library 112 receives the backup instruction information. The backup instruction information may include a command for the first managed application to synchronize application data with the remote storage system 120. Based on the command, the first managed application 110 synchronizes its application data to the remote storage system 120 (arrow "2"). In various embodiments, the remote storage system 120 includes a backup storage system. In certain cases, the first managed application 110 may synchronize all application data to the remote storage system 120. In other cases, the first managed application 110 may synchronize a portion of its application data to the remote storage system 120. In one example, the first managed application 110 synchronizes (e.g., only synchronizes) application data that has changed since a last synchronization operation. Upon completion of the synchronization operation the remote storage system 120 may include a current snapshot of the first application's 110 application data. In some cases, the remote storage system 120 stores the synchronization data from the first application 110 in a storage repository associated with the first application 122. In other cases, the remote storage system 120 stores the synchronization data from the first application 110 in a directory and/or folder for the first application in a storage repository associated with the mobile device 102.

In various embodiments, once the first application 110 has synchronized its application data to the remote storage system 120, the first application 110 updates the backup instruction information to indicate that the first application has completed the synchronization of data to the remote storage system 120. In certain cases, a synchronization status for the first application in the backup instruction information may be updated to a status of complete. The first application 110 may identify a next application to which to send the backup instruction information, and the first application 110 launch the next application and/or send the backup instruction information to a next application (arrow "3").

In various embodiments, the next application (not shown) may synchronize application data to the remote storage system, update the backup instruction information to indicate that its application data has been synchronized, and/or provide the backup instruction data to a next application in a sequence of applications. This process may be repeated for one or more applications until the backup instruction data is provided to an Nth application 116 on the mobile device 102. The Nth application 116 may synchronize its application data to the remote storage system 120 (arrow "4"). Once completed, the Nth application 116 updates the backup instruction information and determines that all applications have synchronized data with the remote storage system 120.

In various embodiments, a last application 116 (e.g., the Nth application) to synchronize with the remote data system 120 launches the management agent 104 and/or provides the backup instruction information to the management agent (arrow "5"). In some embodiments, the management agent 104 generates and/or displays a status of the applications synchronized with the remote data system 120. In some embodiments, a snapshot of backup status may be generated (e.g., by the management agent 104), named, and/or stored. In some embodiments, the management agent 104 provides a snapshot and/or other backup storage status information to the device management server 130. The device management server 130 may store the backup snapshot information and/or other backup status information. The information may be used in an application data restore operation as described in detail below.

In various embodiments (not shown), a management agent 104 may generate backup instruction information including instructions for multiple applications to simultaneously synchronize with the remote storage system 120. In this case, the backup instruction information is provided to multiple applications in parallel, and the multiple applications may simultaneously and/or substantially simultaneously synchronize application data to the remote storage system 120.

Figure 7:
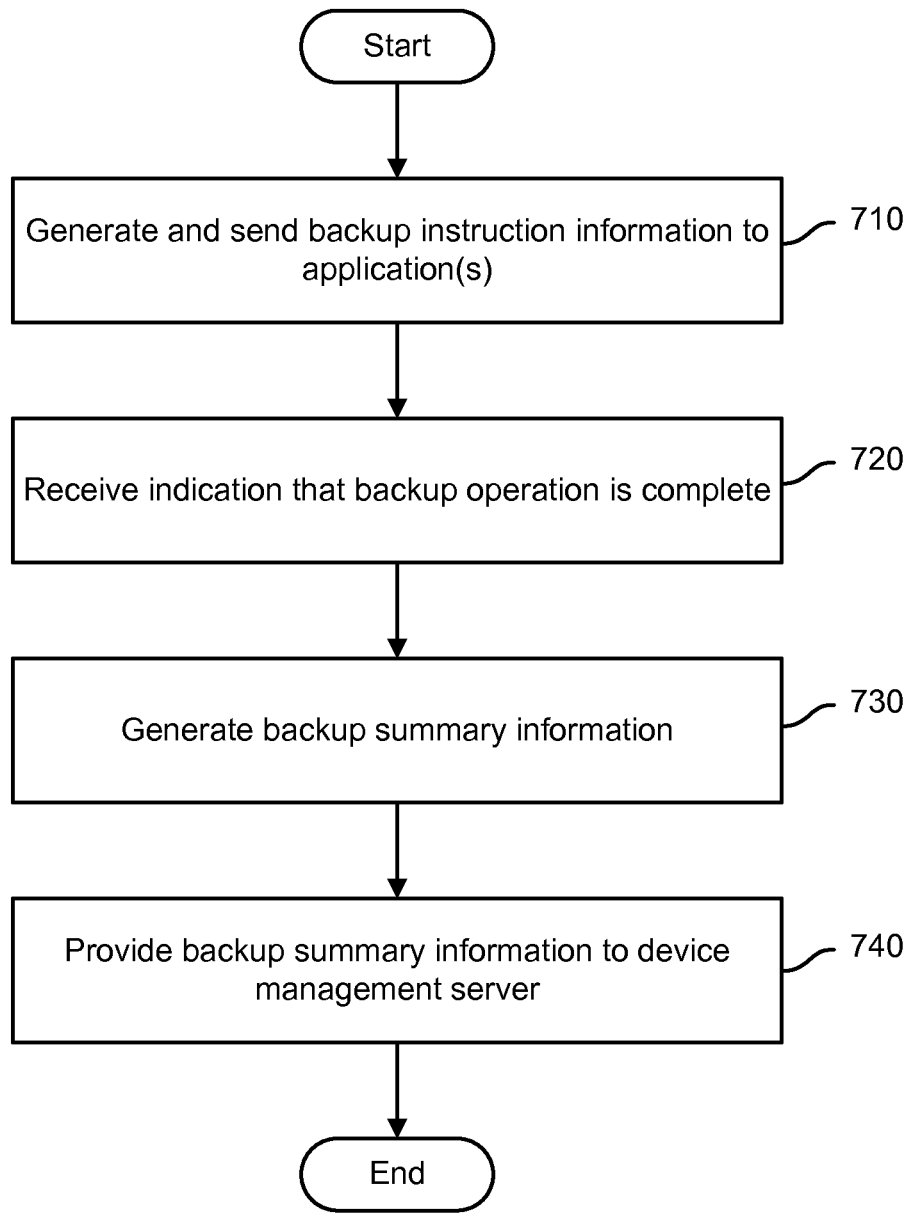
FIG. 7 is a flowchart illustrating embodiments of a process to initiate a backup operation on a mobile device.

FIG. 7 is a flowchart illustrating embodiments of a process to initiate a backup operation on a mobile device. In various embodiments, the process of FIG. 7 is implemented at a management agent on a mobile device, such as management agent 104 of FIG. 6. At 710, backup instruction information is generated and sent to one or more applications. In various embodiments, backup instruction information may include commands for one or more applications to synchronize application data to a remote storage system, a list of one or more managed applications, an order/sequence in which the applications are to synchronize, backup status information for each of the applications, and/or other information. For example, a management agent may determine that one or more applications on a mobile device are to backup/synchronize their application data to a remote storage system. The backup instruction information may include a list of the one or more applications. The backup instruction information may include commands to each of the applications instructing the application to synchronize its data with a remote storage system. The backup instruction information may include an order and/or sequence in which the applications are to synchronize their application data to the remote storage system. In one example, the sequence may instruct a managed browser application to synchronize with the remote storage system then provide the backup instruction information to managed email application. The managed email application is synchronize with the remote storage system and provide the backup instruction information to another application and so until an Nth application on the device has synchronized with the remote storage system. In another example, the sequence may instruct multiple applications to synchronize with the remote data storage system at one time. The backup instruction information may include a status for each of the application backups. Prior to any synchronization operations, the status associated with each application may include "synchronization not complete." As applications synchronize their data to the remote storage system, the applications may update the status to "synchronization complete" and/or another status. In various embodiments, the backup instruction information is provided to one or more applications and a backup operation is initiated.

At 720, an indication is received that a backup operation is complete. In various embodiments, a final application to synchronize its application data to a remote storage system may launch the management agent and/or send the management agent a notification indicating that the backup operation is complete. In certain cases, the notification may include the backup instruction information. The management agent may check the backup status information included in the backup instruction information to verify that each application listed in the backup instruction information has synchronized data to the remote storage system.

At 730, backup summary information is generated. In various embodiments, the management agent generates backup summary information. The backup summary information may include a snapshot of a backup. A snapshot of the backup may indicate a backup status of each application, a time of backup for each application, and/or other information. In some cases, a snapshot may indicate and/or summarize application data associated with each of one or more applications at the time of synchronization/backup. The snapshot may be named and/or stored on the device.

At 740, backup summary information is provided to a device management server. In various embodiments, the management agent provides the backup summary information to the device management server. The device management server may store the backup summary information including, for example, snapshot information and/or other backup summary information. The backup summary information may be used in a managed application restore operation as described in detail below.

In various embodiments, backup summary information stored at the device management server is used to determine application data, application configurations, application settings, and/or other application-related information associated with the device at a certain point in time. In one example, the backup summary information may be used to determine the application information for a phone that has been lost. For example, when an employee loses their phone, an enterprise information technology (IT) department may need to determine the contents of an employee's lost phone to determine any appropriate actions to take. An enterprise may determine, for example, whether any confidential data was included on the device and may take appropriate actions based on the determination. Based on information indicating that application data on the phone includes company-confidential information, an IT department may determine that a lost phone is to be wiped.

Figure 8:
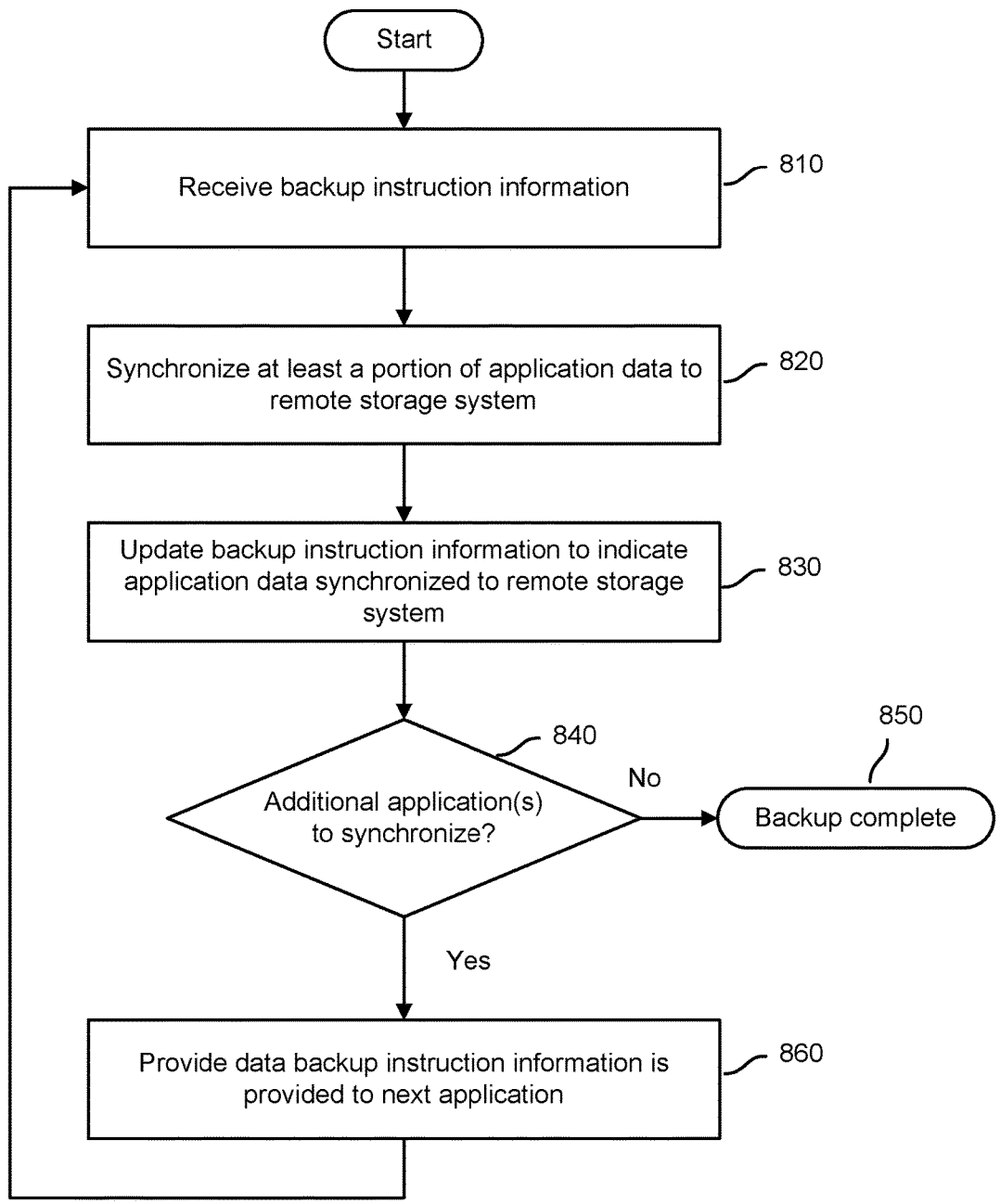
FIG. 8 is a flowchart illustrating embodiments of a process to backup application data to a remote storage system.

FIG. 8 is a flowchart illustrating embodiments of a process to backup application data to a remote storage system. At 810, backup instruction information is received at an application. In various embodiments, an application is launched by a management agent and/or a previous application to synchronize/backup data with a remote storage system. The application receives the backup instruction information including instructions/commands for the application to synchronize its data with a remote storage system.

At 820, an application synchronizes at least a portion of its application data to a remote storage system. In various embodiments, a synchronization library associated with an application synchronizes application data to the remote data storage system. In certain cases, an application synchronizes all application data (e.g., all application data stored persistently to mobile device local storage) to the remote storage system. In other cases, the first managed application 110 may synchronize a portion of its application data to the remote storage system 120. In one example, the first managed application 110 synchronizes (e.g., only synchronizes) application data that has changed since a last synchronization operation.

At 830, the application updates the backup instruction information to indicate that its application data has been synchronized to the remote storage system. In various embodiments, an application updates synchronization/backup status information included in the backup instruction information to indicate that the synchronization/backup process is complete.

At 840, the application determines whether additional applications are to synchronize application data to the remote storage system. In certain cases, the backup instruction information includes a sequence and/or order in which applications are to backup information to a remote storage system. In the event that additional applications follow the current application in the sequence, it may be determined that additional applications are to synchronize with the remote storage system. In some cases, the application may evaluate synchronization status information included in the backup instruction information to determine whether additional applications are to synchronize application data to the remote storage system. In the event that a synchronization status associated with one or more applications is not complete, it may be determined that the applications have yet to synchronize their application data to the remote storage system. In the event it is determined that no additional applications are to synchronize their data to the remote storage system, the process proceeds to step 850. In the event it is determined that additional applications are to synchronize their data to the remote storage system, the process proceeds to step 860.

At 850, it is determined that the backup operation is complete. In various embodiments, a final application to synchronize application data the remote storage system launches the management agent and/or provides the backup instruction information to the management agent.

At 860, backup instruction information is provided to a next application. In various embodiments, an application evaluates backup instruction information to determine a next application in a sequence of applications to synchronize their application data to the remote storage system. The next application may be launched (e.g., using a URL scheme technique), and the backup instruction information is provided to the next application (e.g., via a secure application connection bus). The process may then proceed to step 810, and the next application may receive the backup instruction information and synchronize its data with the remote storage system.

Figure 9:
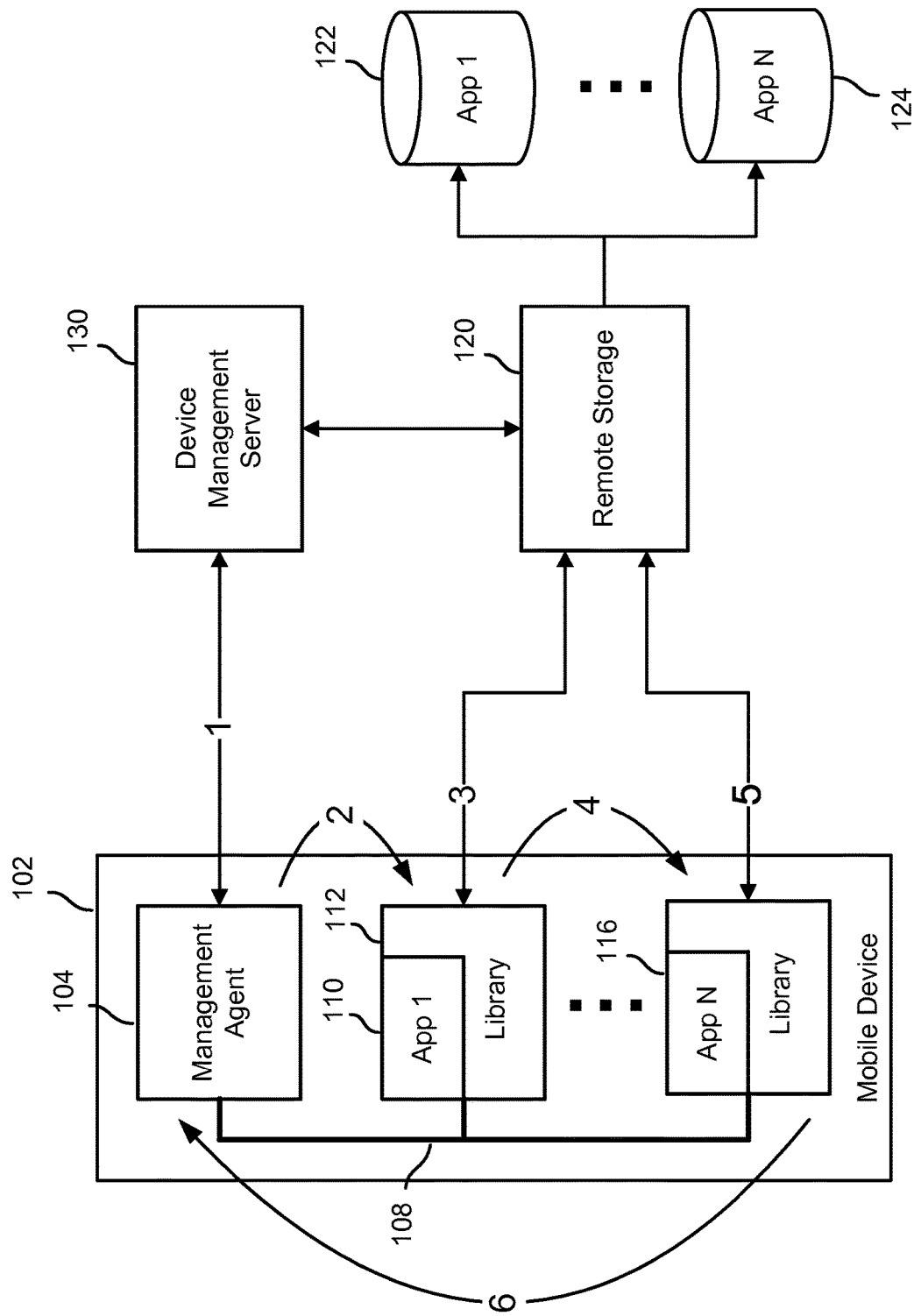
FIG. 9 is a block diagram illustrating embodiments of a system to restore application data.

FIG. 9 is a block diagram illustrating embodiments of a system to restore application data. In various embodiments, the techniques disclosed herein are used to restore one or more applications to a previously synchronized state. In one example, a user purchases a new mobile device, and the user may wish to configure one or more applications on the new device to a previously synchronized state, such as the state of the application(s) on the user's old device. In various embodiments, a restore operation is initiated at the management agent 104 on a device 102. The management agent 104 may, for example, receive commands from a user to restore one or more applications to a previous state. The management agent 104 may communicate with a device management server 130 to determine a backup snapshot (arrow "1"). In certain cases, the management agent 104 retrieves a list of backup snapshots from the device management server 130. The management agent may determine an appropriate backup snapshot, backup time, and/or other information for each of one or more applications on the device 102. The determined snapshot(s) may include a backup snapshot closest to a time to which the user seeks to restore the application(s) on the device. In various embodiments, the management agent 104 generates data restore instruction information. Data restore instruction information may include commands to retrieve application data from a remote storage system, a list of one or more managed applications, an order/sequence in which the applications are to retrieve data from the remote storage system, restore status information for each of the applications, and/or other information. In certain cases, the data restore instruction information includes commands to restore application data to a most recently backed up state. In some cases, the data restore instruction information includes commands to restore application data to an application state at a specific time and/or date, such as a time and/or date of a previous synchronization to the remote storage system.

In various embodiments, a first application 110 is launched and/or data restore instruction information is provided to the first application (arrow "2"). In certain cases, a management agent 104 may launch/activate the first application 110 using a URL scheme associated with the first application 110. The data restore instruction information may be provided from the management agent 104 to the first managed application 110 using a secure application connection bus 108. The first managed application 110 and/or a synchronization library 112 associated therewith receives the data restore instruction information.

In some embodiments, the first application 110 retrieves synchronized application data from the remote storage system 120 (arrow "3"). The synchronized data retrieved from the remote storage system 120 may be stored in local storage (not shown) for the first application on the mobile device 102. In certain cases, the first application 110 may, based on the data restore instruction information, retrieve synchronized application data from the remote storage system 120 to restore the application to its state at a previous point in time as defined in the data restore instruction information. Upon retrieval of the synchronized data, the first application 110 settings, configurations, application data, and/or other information may be restored to the previous state (e.g., a state at the time the synchronization data was sent to the remote storage system 120).

In various embodiments, once the first application 110 has restored its application data, the first application 110 updates the data restore instruction information to indicate that the first application has completed the restore operation. In certain cases, a data restore status for the first application in the restore instructions may be updated to a status of complete. The first application 110 may identify a next application to which to send the data restore instruction information, and the first application 110 launch the next application (e.g., using a URL scheme) and/or send the backup instruction information to a next application (e.g., via the secure application connection bus 108) (arrow "4").

In various embodiments, the next application (not shown) may retrieve synchronized data from the remote storage system and/or restore the application to a previous state. The next application may update the restore instructions to indicate that its application data has been restored. The application may then launch a subsequent application and/or provide the restore instructions to the subsequent application. This process may be repeated for one or more applications until the restore instructions are provided to an Nth application 116 on the mobile device 102. The Nth application 116 may retrieve synchronized data from the remote storage system 120 (arrow "5"). Once completed, the Nth application 116 updates its status in the restore instructions, and the Nth application 116 may determine that all applications have retrieved synchronized data from the remote storage system 120 and have been restored to a previous state.

In various embodiments, a last application 116 (e.g., an Nth application) to retrieve synchronized data from the remote storage system 120 launches the management agent 104 and/or provides the restore instructions information to the management agent (arrow "5"). In certain cases, the managed applications may at this point be restored to the state they were in at a previous point in time, such a state of the application(s) as installed on a previous device.

In various embodiments (not shown), a management agent 104 may generate data restore instruction information including instructions for multiple applications to simultaneously retrieve synchronized data from the remote storage system 120. In this case, the restore instruction information is provided to multiple applications in parallel, and the multiple applications may simultaneously and/or substantially simultaneously retrieve synchronized application data from the remote storage system 120.

Figure 10:
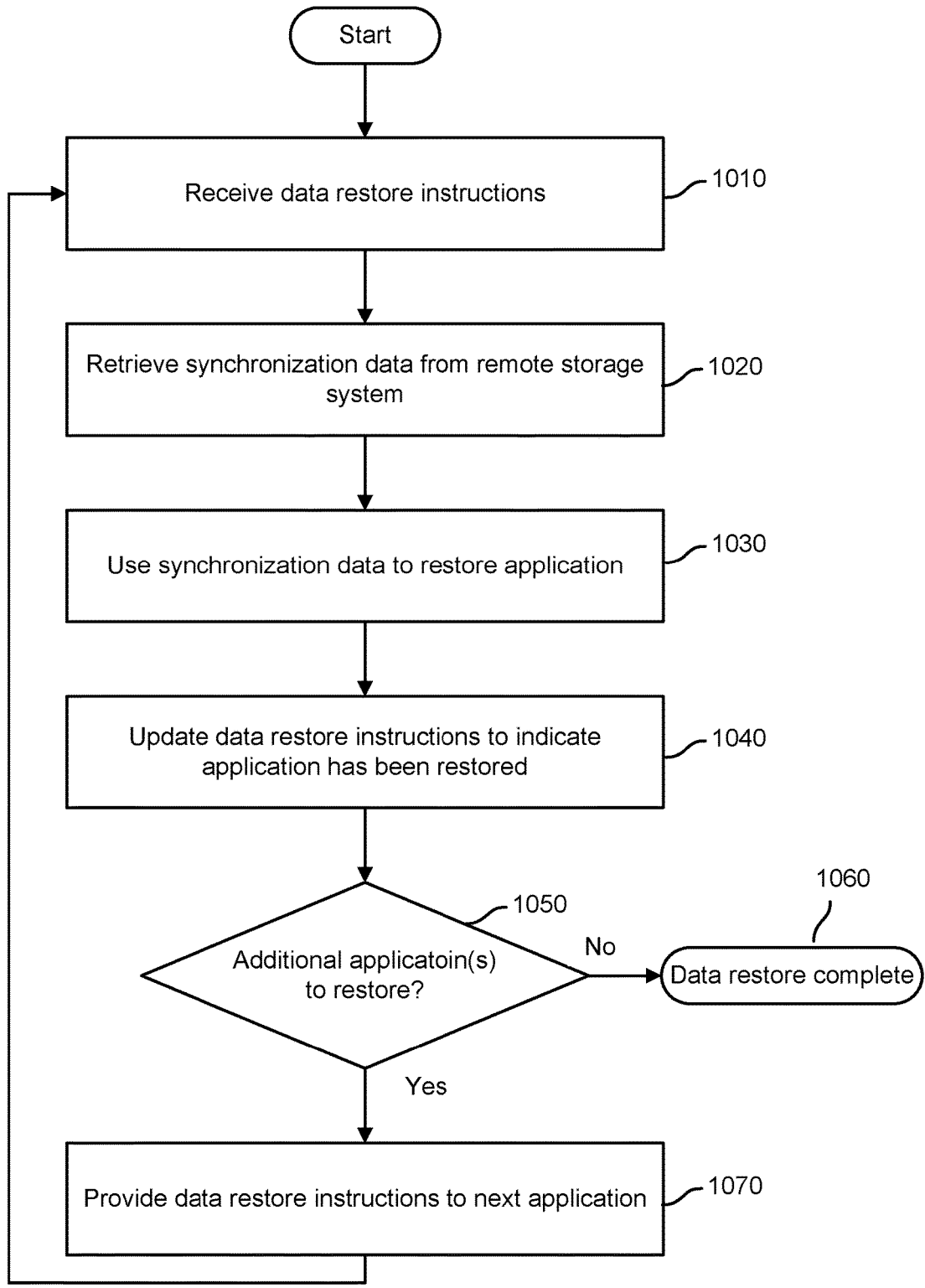
FIG. 10 is a flowchart illustrating embodiments of a process to restore applications to a previous state.

FIG. 10 is a flowchart illustrating embodiments of a process to restore applications to a previous state. At 1010, data restore instruction information is received at an application. In various embodiments, an application is launched by a management agent and/or a previous application to retrieve synchronized data from a remote storage system. The application receives the restore instructions information including instructions/commands for the application to restore itself to a previous state. The data restore instruction information may, for example, identify a time and/or date associated with a synchronization operation previously performed by the application. The data restore instruction information may command the application to retrieve from a remote storage system synchronization data synchronized to the remote storage system at the certain time and/or date in the past.

At 1020, an application retrieves synchronization data from the remote storage system. In various embodiments, a synchronization library associated with an application retrieves synchronization data from the remote storage system. The synchronization library may, for example, retrieve synchronization data synchronized to the remote storage system at the certain time and/or date in the past as defined in data restore instruction information. In one example, the synchronization library may retrieve synchronized application data from the remote storage system that was synchronized to the remote storage system in a specific backup operation, such as a most recent backup operation.

At 1030, synchronization data retrieved from the remote storage system is used to restore the application to a previous state. In various embodiments, the synchronized data retrieved from the remote storage system includes application data, application configuration information, application settings, and/or other application-related data synchronized to the remote storage system at a previous point in time. The retrieved synchronization data may be used to restore to the application to its state (e.g., configuration, settings, data, etc.) at the previous point in time. In one example, an application on a user's new mobile device is restored to a state of an instance of the application on the user's previous mobile device. The settings, configurations, keychain data, credentials, passwords, certificates, application data, and/or other data applicable to the application on the user's previous device at a time of the synchronization are applied to the instance of the application on the user's new mobile device.

At 1040, data restore instruction information is updated to indicate that the application has been restored. In various embodiments, an application updates data restore status information included in the data restore instruction information to indicate that the application has retrieved synchronization data has been restored to a previous state.

At 1050, the application determines whether additional applications are to be restored. In certain cases, the data restore instruction information includes a sequence and/or order in which applications are to be restored. In the event that additional applications follow the current application in the sequence, it may be determined that additional applications are to be restored. In some cases, the application may evaluate data restore status information associated with one or more applications to determine whether any additional applications are slated to perform a data restore operation. In the event that a data restore status associated with an application is listed as not complete, it may be determined that the application has yet to retrieve synchronized data from the remote storage system and/or restore itself to a previous state. In the event it is determined that no additional applications are to be restored, the process proceeds to step 1060. In the event it is determined that additional application(s) are to be restored, the process proceeds to step 1070.

At 1060, it is determined that an application data restore operation is complete. In various embodiments, a final application to retrieve synchronized data from the remote storage system and/or restore itself to a previous state launches the management agent and/or provides the data restore instruction information to the management agent.

At 1070, data restore instruction information is provided to a next application. In various embodiments, an application evaluates data restore instruction information to determine a next application in a sequence of applications to retrieve synchronized data from the remote storage system and/or restore itself to a previous state. The next application may be launched (e.g., using a URL scheme technique), and the data restore instruction information is provided to the next application (e.g., via a secure application connection bus. The process may then proceed to step 1010, and the next application may receive the data restore instruction information.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
receiving, by a management code embedded in mobile app code comprising a mobile app, an indication that the mobile app has performed an operation affecting mobile app data of the mobile app, wherein the management code is configured to modify one or more file access commands in the mobile app code with one or more management code commands, wherein the one or more file access commands includes the operation affecting mobile app data;

in response to receiving the indication, storing, by the management code, at least a portion of the mobile app data to a remote storage system, wherein the one or more management code commands includes the storing at least a portion of the mobile app data to the remote storage system wherein the mobile app data stored at the remote storage system is accessible by a remote system, wherein the remote help system is configured to:

send to a device management server a communication that requests the mobile app data stored at the remote storage system, wherein in response to the communication, the device management server is configured to send to the remote storage system a command to provide the mobile app data stored at the remote storage system to a remote device;

diagnose an issue associated with the mobile app based on the mobile app data provided to the remote device;

update the mobile app data provided to the remote device; and synchronize the updated mobile app data from the remote device to the remote storage system;

receiving an indication to synchronize the mobile app with the updated mobile app data stored at the remote storage system; and synchronizing the mobile app with the updated mobile app data, wherein the issue associated with the mobile app is resolved when the mobile app is synchronized with the updated mobile app data.

2. The method of claim 1, wherein the operation comprises a system call to access persistent data.

3. The method of claim 1, wherein the operation comprises a file access operation.

4. The method of claim 3, wherein the operation comprises one or more of a file open, a file write, a file read, and a file close.

5. The method of claim 3, wherein receiving the indication includes using the management code to intercept a request by the mobile app to perform the file access operation.

6. The method of claim 1, wherein:

the mobile app data of the mobile app includes mobile app data stored persistently by the mobile app on a mobile device; and storing includes synchronizing to the remote storage system at least a portion of the mobile app data stored persistently by the mobile app on a mobile device.

7. The method of claim 6, wherein synchronizing to the remote storage system at least a portion of the mobile app data stored persistently by the mobile app on a mobile device includes synchronizing to the remote storage system a portion of the mobile app data that is affected by a file access operation.

8. The method of claim 6, wherein said step of synchronizing to a remote storage system at least a portion of the mobile app data stored persistently by the mobile app on a mobile device is performed at least in part in response to a communication received from a management agent on the mobile device.

9. The method of claim 8, further comprising using a secure app connection bus on the mobile device to provide to a second mobile app on the mobile device a communication to prompt the second mobile app to synchronize mobile app data associated with the second mobile app.

10. The method of claim 1, wherein the mobile app is installed on a mobile device, wherein said step of storing the mobile app data to the remote storage system is performed asynchronously in the event the operation is performed at time when a connection between the mobile device and the remote storage system is not present, including by storing the mobile app data on the mobile device until such a connection can be established and using the connection to send the mobile app data to the remote storage system.

11. The method of claim 10, wherein the storing the mobile app data on the mobile device includes encrypting the mobile app data and storing the encrypted mobile app data on the mobile device.

12. The method of claim 1, further comprising synchronizing to the remote storage system a mobile app configuration data associated with the mobile device.

13. The method of claim 1, wherein the remote storage system comprises a backup storage system.

14. The method of claim 13, further comprising using the mobile app data stored to the remote storage system to restore the mobile app data to a mobile device, wherein the mobile app is installed on the mobile device.

15. The method of claim 1, wherein the mobile app is installed on a mobile device, wherein the remote storage system is configured to store the stored data in a manner that associates the stored data with one or both of the mobile device and a user with which the mobile device is associated.

16. The method of claim 1, wherein the remote storage system is configured to provide access to the stored data to an authorized remote user.

17. The method of claim 16, wherein the remote storage system is configured to enable the authorized remote user to make changes to the stored data, and to synchronize to the mobile device changes made by the authorized remote user to the stored data as stored at the remote storage system.

18. The method of claim 16, wherein the remote storage system is configured to enable the authorized remote user to make changes to the stored data, and to synchronize to a plurality of mobile devices the changes made by the authorized remote user to the stored data as stored at the remote storage system.

19. The method of claim 16, wherein the remote storage system is configured to enable the authorized remote user to use the stored data to generate a template associated with the mobile application, modify the template, and synchronize the modified template with a plurality of mobile devices.

20. The method of claim 1, wherein the remote help system is separate from the device management server, the remote storage system, and the remote device.

21. A system, comprising:

a processor; and a memory coupled with the processor, wherein the memory is configured to provide the processor with instructions which when executed cause the processor to:

receive, by a management code embedded in mobile app code comprising a mobile app, an indication that the mobile app has performed an operation affecting mobile app data of the mobile app, wherein the management code is configured to modify one or more file access commands in the mobile app code with one or more management code commands, wherein the one or more file access commands includes the operation affecting mobile app data;

in response to a step of receiving the indication, store, by the management code, at least a portion of the mobile app data to a remote storage system, wherein the one or more management code commands includes the storing at least a portion of the mobile app data to the remote storage system, wherein the mobile app data stored at the remote storage system is accessible by a remote help system, wherein the remote help system is configured to:
  send to a device management server a communication that requests the mobile app data stored at the remote storage system, wherein in response to the communication, the device management server is configured to send to the remote storage system a command to provide the mobile app data stored at the remote storage system to a remote device;
  diagnose an issue associated with the mobile app based on the mobile app data provided to the remote device;
  update the mobile app data provided to the remote device; and
  synchronize the updated mobile app data from the remote device to the remote storage system;
receive an indication to synchronize the mobile app with the updated mobile app data stored at the remote storage system; and
synchronize the mobile app with the updated mobile app data, wherein the issue associated with the mobile app is resolved when the mobile app is synchronized with the updated mobile app data.

22. A computer program product, the computer program product being embodied in a tangible non-transitory computer readable storage medium and comprising computer instructions for:
  receiving, by a management code embedded in mobile app code comprising a mobile app, an indication that the mobile app has performed an operation affecting mobile app data of the mobile app, wherein the management code is configured to modify one or more file access commands in the mobile app code with one or more management code commands, wherein the one or more file access commands includes the operation affecting mobile app data;
  in response to receiving the indication, storing, by the management code, at least a portion of the mobile app data to a remote storage system, wherein the one or more management code commands includes the storing at least a portion of the mobile app data to the remote storage system, wherein the mobile app data stored at the remote storage system is accessible by a remote help system, wherein the remote help system is configured to:
    send to a device management server a communication that requests the mobile app data stored at the remote storage system, wherein in response to the communication, the device management server is configured to send to the remote storage system a command to provide the mobile app data stored at the remote storage system to a remote device;
    diagnose an issue associated with the mobile app based on the mobile app data provided to the remote device;
    update the mobile app data provided to the remote device; and
    synchronize the updated mobile app data from the remote device to the remote storage system;
  receiving an indication to synchronize the mobile app with the updated mobile app data stored at the remote storage system; and
  synchronizing the mobile app with the updated mobile app data, wherein the issue associated with the mobile app is resolved when the mobile app is synchronized with the updated mobile app data.

* * * * *